United States Patent
Kishi et al.

(10) Patent No.: US 10,295,372 B2
(45) Date of Patent: May 21, 2019

(54) MAGNETIC ROTATION DETECTION APPARATUS

(71) Applicant: TOYO DENSO KABUSHIKI KAISHA, Minato-ku (JP)

(72) Inventors: Shoji Kishi, Kawagoe (JP); Toshiya Yoshida, Kawagoe (JP)

(73) Assignee: TOYO DENSO KABUSHIKI KAISHA, Tokyo (JP)

( * ) Notice: Subject to any disclaimer, the term of this patent is extended or adjusted under 35 U.S.C. 154(b) by 53 days.

(21) Appl. No.: 15/606,183

(22) Filed: May 26, 2017

(65) Prior Publication Data

US 2017/0343383 A1    Nov. 30, 2017

(30) Foreign Application Priority Data

May 27, 2016 (JP) ................. 2016-106305

(51) Int. Cl.
  *G01D 5/14*    (2006.01)
  *G01D 11/24*   (2006.01)
  *G01B 7/00*    (2006.01)
  *G01B 7/30*    (2006.01)
  *G01D 5/20*    (2006.01)
  *F16H 63/42*   (2006.01)

(52) U.S. Cl.
  CPC .............. *G01D 5/145* (2013.01); *G01D 5/147* (2013.01); *G01D 11/245* (2013.01); *F16H 63/42* (2013.01); *G01B 7/001* (2013.01); *G01B 7/30* (2013.01); *G01D 5/20* (2013.01)

(58) Field of Classification Search
  CPC ........ G01B 7/001; G01D 5/125; G01D 5/142; G01D 5/145; G01D 5/147; G01D 5/20; G01D 11/245; F16H 63/42

USPC ................................. 310/40 R, 90, 90.5, 91; 324/207.2–207.25

See application file for complete search history.

(56) References Cited

U.S. PATENT DOCUMENTS

| 8,717,011 B2* | 5/2014 | Henning | ................ G01D 5/145 |
| | | | 324/207.25 |
| 2001/0037794 A1* | 11/2001 | Wayama | ................ F02D 9/105 |
| | | | 123/399 |
| 2012/0146630 A1* | 6/2012 | Itomi | .................... G01D 5/145 |
| | | | 324/207.25 |

(Continued)

FOREIGN PATENT DOCUMENTS

JP       5148418       12/2012

*Primary Examiner* — Jeff W Natalini
*Assistant Examiner* — Steven L Yeninas
(74) *Attorney, Agent, or Firm* — Cozen O'Connor

(57) ABSTRACT

A magnetic rotation detection apparatus which is capable of suppressing occurrence of assembly failure of components. A gear position sensor 10 is provided with a sensor unit 12 including a Hall element 20, a magnet shaft 11 including a magnet 17, a case 14 housing the sensor unit 12 and the magnet shaft 11, and an inner O-ring 24 sealing a gap between the sensor unit 12 and the case 14. The case 14 includes a metal bearing 19 to support the magnet shaft 11, and the magnet shaft 11 includes a molded portion 18 to fix the magnet 17. A thrust plate 22 is arranged between the molded portion 18 and a base plate 21 (circuit board) of the sensor unit 12, and a spring mechanism 26 is arranged to bias the molded portion 18 to the thrust plate 22. A minute gap is present between the metal bearing 19 and the magnet shaft 11.

6 Claims, 9 Drawing Sheets

(56) References Cited

U.S. PATENT DOCUMENTS

2014/0077922 A1\* 3/2014 Horiguchi .............. G01D 5/145
338/12
2015/0377649 A1\* 12/2015 Nakayama ........... G01D 11/245
324/207.2
2016/0285331 A1\* 9/2016 Ichikawa ............... G01D 5/145

\* cited by examiner

MAGNETIC ROTATION DETECTION APPARATUS

BACKGROUND OF THE INVENTION

Field of the Invention

This application claims the benefit of Japanese Patent Application No. 2016-106305 filed on May 27, 2016 which is hereby incorporated by reference herein in its entirety.

The present invention relates to a magnetic rotation detection apparatus that detects an absolute rotation angle, and particularly to a magnetic rotation detection apparatus for detection of a gear position of a motorcycle.

Description of the Related Art

A magnetic rotation detection apparatus (gear position sensor) that detects a gear position selected by a driver, such as first position or second position, in a motorcycle has been known. The gear position sensor is connected to a shift drum which is built in transmission and detects the gear position based on a rotation angle of the shift drum.

Conventionally, a gear position sensor 120 includes a shaft 121 that rotates in response to rotation of the shift drum and a circuit board 122 that is arranged such as to face the shaft 121 on the extension of a rotation axis of the shaft 121 as illustrated in FIG. 13. A magnet 123 serving as a permanent magnet is provided at an end facing the circuit board 122 of the shaft 121, and a Hall element 124 is provided at the circuit board 122 such that the rotation angle of the shift drum is detected as the Hall element 124 detects a change of magnetic field intensity accompanying rotation of the magnet 123 which rotates along with the shaft 121 (for example, see Japanese Patent No. 5148418).

In the gear position sensor 120, gaps are positively provided among the respective constituent elements and the shaft 121 in order to implement smooth rotation of the shaft 121. Accordingly, the magnet 123 of the shaft 121 and the circuit board 122 do not contact each other, and a gap is provided between the magnet 123 and the circuit board 122 in a rotation-axis direction (hereinafter, referred to as a "thrust direction") of the shaft 121.

Recently, output of an engine should be controlled precisely, and the gear position is considered at the time of executing traction control of the engine output. In addition, stages of a transmission have been also increased in order for improvement of fuel economy and improvement of drivability. As a result, there is a demand for gear position detection with higher accuracy. Meanwhile, the magnetic field intensity is changed due to movement of the thrust direction of the shaft 121 (the magnet 123) as well as the rotation of the shaft 121 since the gap is provided between the magnet 123 and the circuit board 122 in the thrust direction in the conventional gear position sensor 120 as described above, which makes it difficult to detect the gear position with higher accuracy.

To cope with this, the present inventors and his/her colleagues have studied a method of holding the shaft 121 with an oil seal 125 as illustrated in FIG. 14. The oil seal 125 is in contact with the shaft 121 with high surface pressure, and thus, can suppress movement of the shaft 121 (the magnet 123) in the thrust direction.

Meanwhile, the shaft 121 and the circuit board 122 are housed inside a case 126 of the gear position sensor 120. As described above, the shaft 121 is held by the oil seal 125, and the circuit board 122 is held by a holder 127 while the holder 127 abutting on an inner wall of the case 126. Further, a potting resin 128, such as resin, is injected into a space formed by the circuit board 122 and the inner wall of the case 126, and a position of the circuit board 122 inside the case 126 is fixed as the potting resin 128 is cured. In order to prevent the potting resin 128 from flowing into the gap between the circuit board 122 and the magnet 123 through a gap between the inner wall of the case 126 and a wall portion of the holder 127 that opposes the inner wall of the case 126 (hereinafter, referred to as an "facing wall") at the time of injecting the potting resin 128, an O-ring 129 is provided at the facing wall of the holder 127 in the gear position sensor 120, and the O-ring 129 seals the gap between the inner wall of the case 126 and the facing wall of the holder 127.

However, the shaft 121 has been already arranged inside the case 126 and held by the oil seal 125 when the holder 127 is inserted inside the case 126, and the oil seal 125 does not leak air at the time of moving the holder 127 toward the shaft 121 (the magnet 123) inside the case 126 so that air inside a space 130 surrounded by the O-ring 129 of the holder 127 and the oil seal 125 is compressed, and internal pressure of the space 130 increases. As a result, high-pressure air from the space 130 shifts the O-ring 129 from the facing wall of the holder 127, and the O-ring 129 fails to seal the gap between the inner wall of the case 126 and the facing wall of the holder 127 in some cases. That is, there is a risk that assembly failure of components of the gear position sensor 120 may occur. When the assembly failure of components of the gear position sensor 120 occurs, the potting resin 128 flows into the gap between the circuit board 122 and the magnet 123, and there is a risk that the accuracy in detection of the change of the magnetic field intensity accompanying the rotation of the magnet 123, that is, the rotation angle of the magnet 123 using the Hall element 124 may decrease.

SUMMARY OF THE INVENTION

The present invention provides a magnetic rotation detection apparatus which has high detection accuracy of a rotation angle and is capable of suppressing occurrence of assembly failure of components.

Accordingly, an aspect of the invention provides the magnetic rotation detection apparatus comprising a circuit board that includes a Hall element; a rotation shaft which includes a magnet at an end facing the circuit board thereof; a container that houses the circuit board and the rotation shaft; and a sealing member that seals a gap between the circuit board and an inner wall of the container, the container including a bearing to rotatably support the rotation shaft, a part of the rotation shaft protruding from the bearing and being engaged with a rotating body present outside the container, rotation of the magnet, which rotates along with the rotation shaft, being detected by the Hall element, the rotation shaft includes a holding portion which fixes the magnet to the end such that the end and the magnet maintain a predetermined interval therebetween, a receiving member is arranged between the holding portion of the rotation shaft and the circuit board and a biasing member which biases the holding portion of the rotation shaft to the receiving member is arranged inside the container, and a minute gap is present between the bearing and the rotation shaft.

According to an embodiment of the present invention, the receiving member is arranged between the holding portion of the rotation shaft and the circuit board, and the biasing member which biases the holding portion of the rotation shaft to the receiving member is arranged inside the container. Thus, the holding portion of the rotation shaft continuously abuts on the receiving member, and as a result, a distance between the magnet, which is fixed to the end of the rotation shaft by the holding portion, and the circuit board is not changed. As a result, a change of magnetic field intensity caused due to movement of the magnet in an axial direction of the rotation shaft does not occur, and it is possible to accurately detect a rotation angle of the rotation shaft. In addition, the holding portion fixes the magnet at the end such that the end of the rotation shaft and the magnet maintain the predetermined interval therebetween. Thus, the magnet does not contact the end of the rotation shaft, and hence a magnetic force of the magnet is not leaked through the rotation shaft. As a result, it is possible to suppress a decrease of detection accuracy of the rotation angle of the rotation shaft caused by a decrease of the magnetic force of the magnet. Further, the minute gap is present between the bearing, which rotatably supports the rotation shaft, and the rotation shaft. Thus, a space between the holding portion of the rotation shaft and the circuit board is not completely sealed inside the container, air of the space is not compressed when the circuit board is inserted inside the container, and internal pressure of the space does not increase. As a result, it is possible to suppress occurrence of the assembly failure of components including the circuit board that is caused due to the internal pressure of the space.

Further features of the present invention will become apparent from the following description of exemplary embodiments (with reference to the attached drawings).

DESCRIPTION OF THE EMBODIMENTS

Hereinafter, an embodiment of the present invention will be described in detail with reference to the drawings.

Figure 1:
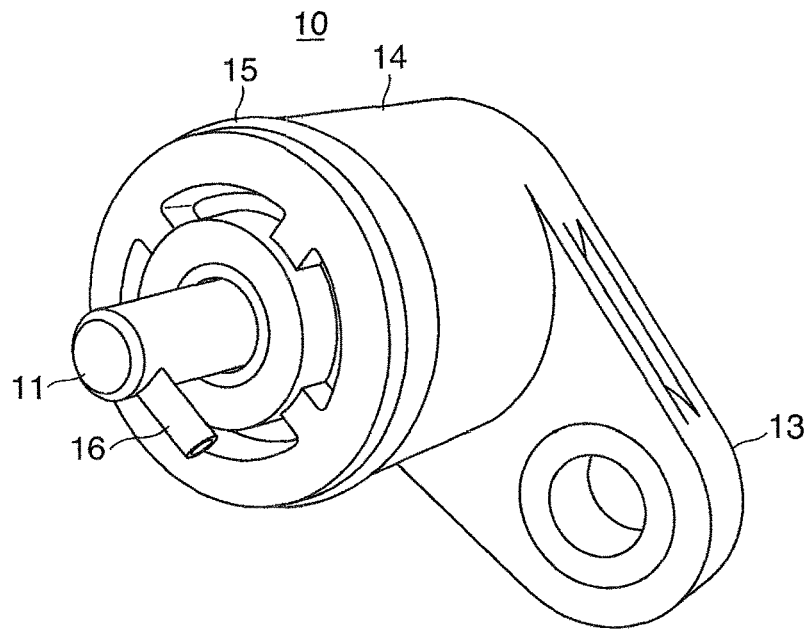
FIG. 1 is a perspective view schematically showing appearance of a gear position sensor as a magnetic rotation detection apparatus according to an embodiment of the present invention.
Figure 2:
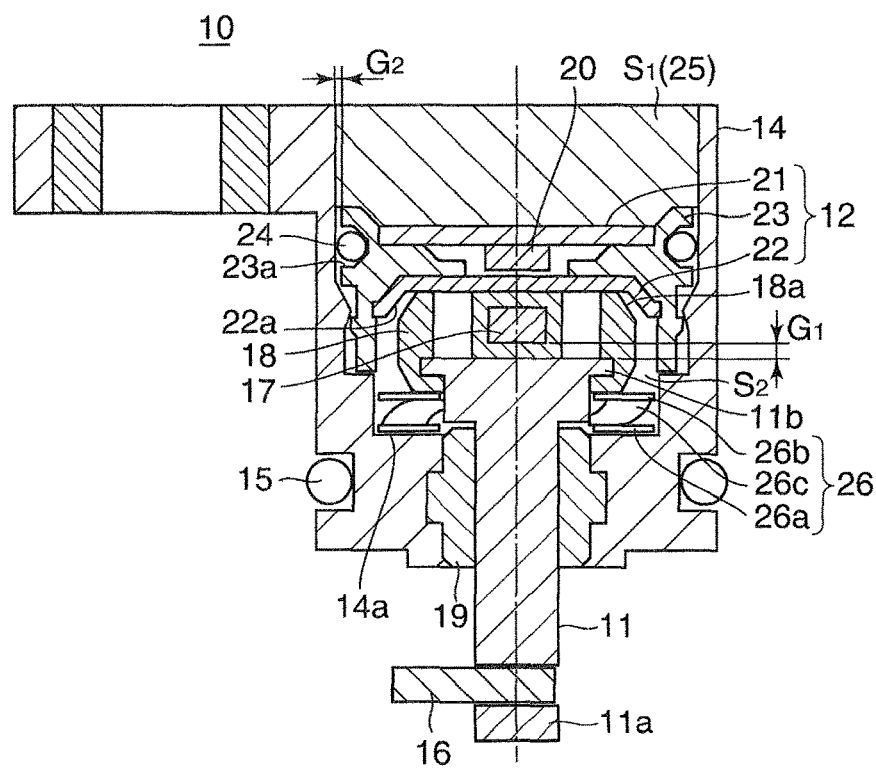
FIG. 2 is a cross-sectional view schematically showing an internal structure of the gear position sensor of FIG. 1.
Figure 3:
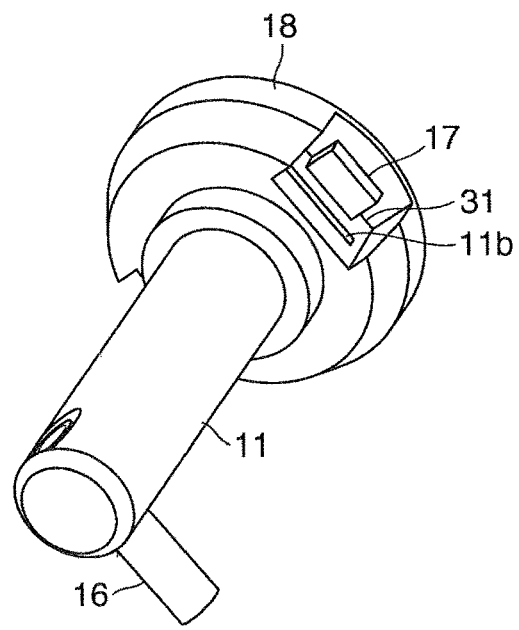
FIG. 3 is a perspective view schematically showing appearance of a magnet shaft as a component of the gear position sensor of FIG. 1.
Figure 4:
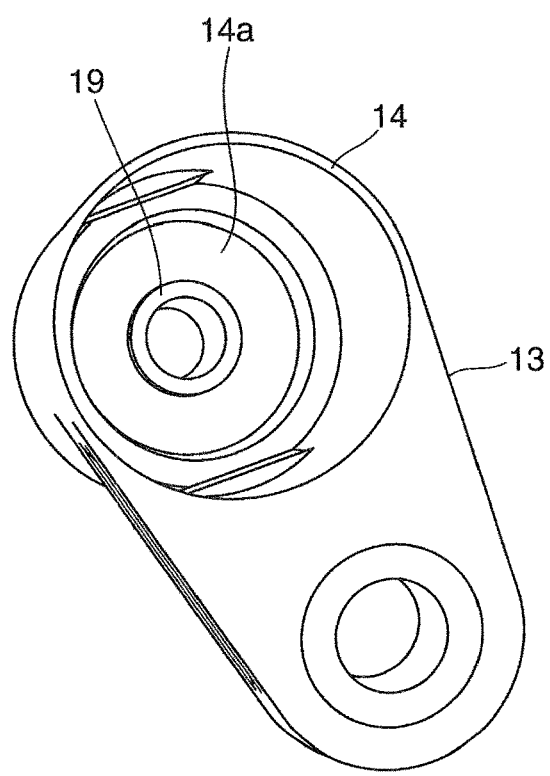
FIG. 4 is a perspective view schematically showing appearance of a case as a component of the gear position sensor of FIG. 1.
Figure 5:
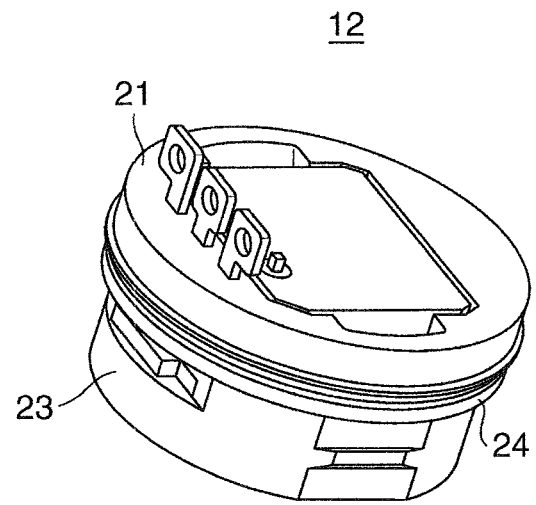
FIG. 5 is a perspective view schematically showing a configuration of a sensor unit as a component of the gear position sensor of FIG. 1.
Figure 6:
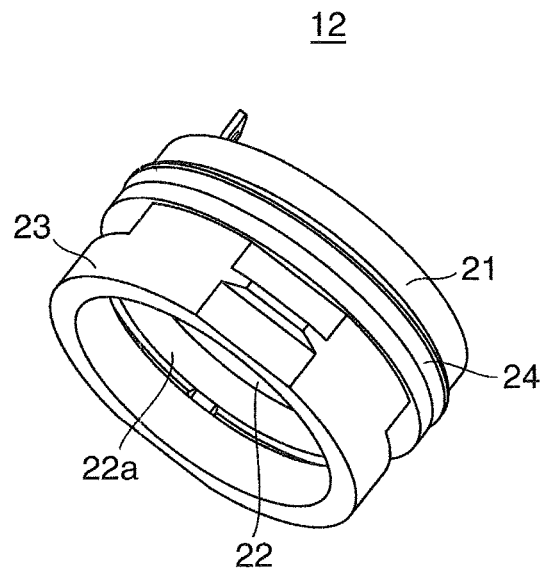
FIG. 6 is a perspective view schematically showing the configuration of the sensor unit of FIG. 5 seen from an opposite side to FIG. 5.

FIG. 1 is a perspective view schematically showing appearance of a gear position sensor as a magnetic rotation detection apparatus according to an embodiment of the present invention, FIG. 2 is a cross-sectional view schematically showing an internal structure of the gear position sensor of FIG. 1, FIG. 3 is a perspective view schematically showing appearance of a magnet shaft as a component of the gear position sensor of FIG. 1, FIG. 4 is a perspective view schematically showing appearance of a case as a component of the gear position sensor of FIG. 1, FIG. 5 is a perspective view schematically showing a configuration of a sensor unit as a component of the gear position sensor of FIG. 1, and FIG. 6 is a perspective view schematically showing the configuration of the sensor unit of FIG. 5 seen from an opposite side to FIG. 5.

A gear position sensor 10 (magnetic rotation detection apparatus) is a magnetic-type absolute rotation angle detecting device that detects an absolute rotation angle, and includes a magnet shaft 11 (rotation shaft) as a long shaft-like body which rotates about a central axis thereof, a sensor unit 12 which is arranged on the extension of the central axis of the magnet shaft 11 to face the magnet shaft 11, a substantially cylindrical case 14 (container) which houses the magnet shaft 11 and the sensor unit 12, includes a protruding portion 13 on a side thereof, and has one end that is opened, and an outer O-ring 15 that is arranged to be wound around an outer circumferential surface of the case 14 as illustrated in FIGS. 1 to 6.

The magnet shaft 11 is housed in the case 14 such that one end 11a thereof protrudes from the case 14 along the central axis of the case 14. In addition, a pin 16 to be engaged with a rotating shaft 28 of a shift drum 27, which will be described later, is attached in the vicinity of the one end 11a of the magnet shaft 11 so as to be orthogonal to the central axis of the magnet shaft 11. A magnet 17, which is a rectangular parallelepiped permanent magnet, is arranged at another end 11b of the magnet shaft 11 that is housed in the case 14 of the magnet shaft 11 so as to be orthogonal to the central axis of the magnet shaft 11, and the magnet 17 is fixed to the other end 11b in the state of being held by a molded portion 18 made of injection molding resin. Accordingly, when the magnet shaft 11 rotates about the central axis, the magnet 17 also rotates about the central axis of the magnet shaft 11. The molded portion 18 holds the magnet 17 to be spaced apart from the other end 11b so as to maintain a predetermined interval $G_1$ between the other end 11b and the magnet 17. In addition, the molded portion 18 forms a short cylindrical shape, and includes a tapered portion 18a such that a diameter of a circumferential edge thereof decreases toward an end thereof.

The case 14 includes a metal bearing 19 which is a bearing, arranged so as to surround the central axis, at a closed end (hereinafter, referred to as a "case bottom") 14a thereof. The metal bearing 19 supports the magnet shaft 11 so as to be rotatable about the central axis. A minute gap, which enables entering of oil for lubrication of a transmission, is provided between the metal bearing 19 and the magnet shaft 11.

The sensor unit 12 includes a discoid base plate 21 (circuit board) including a Hall element 20, a substantially discoid thrust plate 22 (receiving member) which is made of non-magnetic metal and arranged between the molded portion 18 of the magnet shaft 11 and the base plate 21 inside the case 14, and a substantially cylindrical holder 23 which holds the base plate 21 and the thrust plate 22 to be parallel with each other and orthogonal to the central axis of the case 14. The holder 23 is arranged such that the central axis of the holder 23 matches the central axis of the case 14 inside the case 14, and the Hall element 20 is arranged in the vicinity of the central axis of the holder 23 in the base plate 21.

In the gear position sensor 10, the sensor unit 12 is arranged inside the case 14 so as to seal the other end 11b of the magnet shaft 11 housed inside the case 14. Accordingly, the other end 11b of the magnet shaft 11 faces the sensor unit 12, and as a result, the Hall element 20 of the base plate 21 faces the magnet 17 held by the molded portion 18. When the magnet shaft 11 rotates, the Hall element 20 detects a rotation angle of the magnet shaft 11 by detecting a change of magnetic field intensity accompanying rotation of the magnet 17 which rotates along with the magnet shaft 11. Here, the magnet shaft 11 is engaged with the rotating shaft 28 of the shift drum 27 via the pin 16 as described above, and as a result, the Hall element 20 can detect the rotation angle of the shift drum 27, that is, a gear position selected by a driver using a shift pedal or the like.

A gap $G_2$ is provided between a side wall 23a of the housed holder 23 and the inner wall of the case 14 inside the case 14 in order to improve insertability of the holder 23. Further, an inner O-ring 24 is provided on the side wall 23a of the holder 23, and the inner O-ring 24 seals the gap $G_2$. A potting resin 25, such as resin, is injected into a space $S_1$ formed by the sensor unit 12 and the inner wall of the case 14, and the position of the sensor unit 12 inside the case 14 is fixed as the potting resin 25 is cured. When the potting resin 25 is injected into the space $S_1$, the potting resin 25 enters the gap $G_2$, but the potting resin 25 does not enter a space $S_2$ between the sensor unit 12 and the case bottom 14a since the inner O-ring 24 seals the gap $G_2$ as described above.

In addition, the gear position sensor 10 includes a spring mechanism 26 which is arranged inside the case 14. The spring mechanism 26 includes a pair of washers 26a and 26b and a wave washer 26c (biasing member) which is arranged between the pair of washers 26a and 26b. The pair of washers 26a and 26b and the wave washer 26c is arranged to be orthogonal to the central axis of the case 14 at the case bottom 14a, is interposed between the case bottom 14a and the molded portion 18 of the magnet shaft 11, and biases the molded portion 18 toward the sensor unit 12. Accordingly, the molded portion 18 continuously abuts on the thrust plate 22.

The thrust plate 22 of the sensor unit 12 includes a tapered portion 22a in which a diameter of a circumferential edge thereof increases toward the case bottom 14a. A minimum diameter of the tapered portion 22a of the thrust plate 22 is set to be larger than a minimum diameter of the tapered portion 18a of the molded portion 18, and an inclination angle (opening angle) the tapered portion 22a is larger than an inclination angle (opening angle) of the tapered portion 18a. Accordingly, when the molded portion 18 abuts on the thrust plate 22, the tapered portion 18a of the molded portion 18 does not contact the tapered portion 22a of the thrust plate 22, and as a result, the molded portion 18 abuts on the thrust plate 22 in the vicinity of the center of the thrust plate 22 which is present on the extension of the central axis of the magnet shaft 11.

Figure 7:
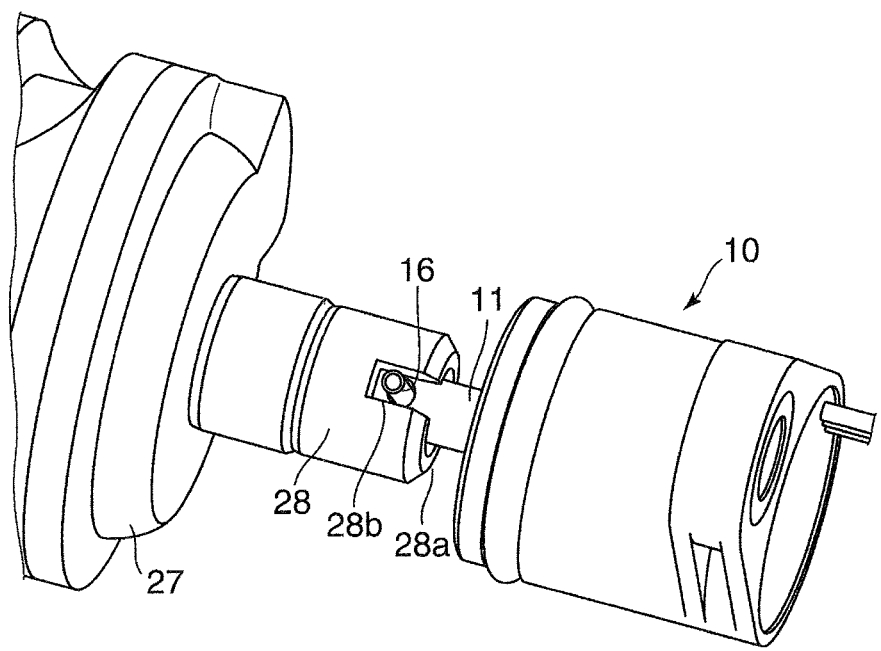
FIG. 7 is a diagram indicating a mode of assembling the gear position sensor of FIG. 1 to an external shift drum.

FIG. 7 is a diagram indicating a mode of assembling the gear position sensor of FIG. 1 to the external shift drum.

In FIG. 7, the substantially cylindrical shift drum 27 includes the rotating shaft 28 protruding from an end thereof. The rotating shaft 28 rotates by a predetermined rotation angle depending on the gear position selected by the driver using the shift pedal or the like. The end of the rotating shaft 28 has a fitting portion 28a which is formed in a cylindrical shape, and a slit 28b, which is formed to be parallel with the central axis of the rotating shaft 28, is provided in the fitting portion 28a. When the gear position sensor 10 is assembled with the shift drum 27, the one end 11a of the magnet shaft 11 of the gear position sensor 10 is fitted into the fitting portion 28a of the rotating shaft 28, and the pin 16 is engaged with the slit 28b. Accordingly, the rotation of the rotating shaft 28 is transmitted to the magnet shaft 11 via the pin 16, thereby rotating the magnet shaft 11.

According to the gear position sensor 10 illustrated in FIGS. 1 to 6, the thrust plate 22 is arranged between the molded portion 18 of the magnet shaft 11 and the base plate 21 of the sensor unit 12, and the wave washer 26c of the spring mechanism 26 that biases the molded portion 18 toward the thrust plate 22 is provided inside the case 14. Thus, the molded portion 18 continuously abuts on the thrust plate 22, and as a result, a distance between the magnet 17, fixed to the other end 11b of the magnet shaft 11 by the molded portion 18, and the Hall element 20 of the base plate 21 is not changed. As a result, the change of the magnetic field intensity caused due to movement of the magnet 17 in the center-axis direction of the magnet shaft 11 does not occur, and it is possible to accurately detect the rotation angle of the magnet shaft 11.

In addition, the molded portion 18 abuts on the thrust plate 22 as described above, and thus, there is no gap between the molded portion 18 and the thrust plate 22. Accordingly, a minute foreign substance, such as iron powder, does not enter between the molded portion 18 and the thrust plate 22, and hence it is possible to prevent the distance between the magnet 17 and the Hall element 20 from being changed due to presence of the minute foreign substance. Further, since the molded portion 18 continuously abuts on the thrust plate 22, the molded portion 18 does not repeatedly separate from and abut on the thrust plate 22 when the magnet shaft 11 (the molded portion 18) rotates with respect to the thrust plate 22. In particular, the molded portion 18 hardly wears even when the molded portion 18 rotates in the state of abutting on the thrust plate 22 since the thrust plate 22 is made of the non-magnetic metal and the molded portion 18 is made of the injection molding resin. As a result, it is possible to smoothly rotate the magnet shaft 11 over a long period of time.

Further, since the molded portion 18 abuts on the thrust plate 22 in the vicinity of the center of the thrust plate 22 in the above-described gear position sensor 10, it is possible to prevent an increase of a rotational resistance moment, which is caused by a frictional force generated due to the abutment between the molded portion 18 and the thrust plate 22 and acts on the magnet shaft 11, thereby smoothly rotating the magnet shaft 11 even in the state where the molded portion 18 abuts on the thrust plate 22. It should be noted that the oil for lubrication of the transmission enters the space $S_2$ via the minute gap between the metal bearing 19 and the magnet shaft 11, and the smooth rotation of the magnet shaft 11 can be secured to some extent as the oil enters the minute gap between the molded portion 18 and the thrust plate 22 in the above-described gear position sensor 10. Thus, the tapered portion 18a may contact the tapered portion 22a, and the molded portion 18 and the thrust plate 22 do not necessarily include the tapered portion 22a and the tapered portion 18a, respectively, in some cases.

In addition, the molded portion 18 fixes the magnet 17 to the other end 11b such that the predetermined interval $G_1$ between the other end 11b of the magnet shaft 11 and the magnet 17 is maintained in the above-described gear position sensor 10, and thus the magnet 17 does not contact the other end 11b, and a magnetic force of the magnet 17 does not leak via the magnet shaft 11. As a result, it is possible to suppress a decrease of the detection accuracy of the rotation angle of the magnet shaft 11 caused by a decrease of the magnetic force of the magnet 17.

Further, the spring mechanism 26 arranged inside the case 14 is configured to include the washers 26a and 26b and the wave washer 26c in the above-described gear position sensor 10, and thus, can be stably arranged in the case bottom 14a in an easy manner. As a result, it is possible to improve an assembling property of components of the gear position sensor 10.

In addition, since the molded portion 18 is caused to abut on the thrust plate 22 by the spring mechanism 26 in the gear position sensor 10, the magnet shaft 11 does not move along the central axis, and the magnet shaft 11 does not wobble at the time of fitting the magnet shaft 11 to the fitting portion 28a of the rotating shaft 28 of the shift drum 27. As a result, it is possible to easily fit the magnet shaft 11 to the rotating shaft 28, and it is possible to improve an assembling property of the gear position sensor 10 with the shift drum 27.

As described above, the detection accuracy of the rotation angle of the magnet shaft 11 in the gear position sensor 10 is improved compared to the detection accuracy of a rotation angle in the conventional gear position sensor (for example, a gear position sensor 120), and thus, it is possible to further improve ease of assembly with the shift drum 27 by making use of the improvement allowance of the detection accuracy of the rotation angle. For example, looseness between the fitting portion 28a of the rotating shaft 28 and the pin 16 of the magnet shaft 11 also contributes on the detection accuracy of the rotation angle, and thus, it is possible to expect to maintain the detection accuracy of the rotation angle similar to the conventional gear position sensor even when the ease of assembly of the pin 16 with the rotating shaft 28 is further improved by setting the looseness between the fitting portion 28a and the pin 16 to be more than the conventional looseness using the improvement allowance of the detection accuracy of the rotation angle. That is, there is no necessity to make an engagement structure between the rotating shaft 28 and the magnet shaft 11 complicate for maintaining the detection accuracy of the rotation angle, and accordingly, it is possible to reduce manufacturing cost or yield of the rotating shaft 28 or the gear position sensor 10. Meanwhile, since the magnet shaft 11 does not wobble as described above, it is possible to maintain the ease of assembly similar to the conventional level even when the looseness between the fitting portion 28a and the pin 16 is set to be less than the conventional looseness. Then, even when the rotating shaft 28 slightly rotates, it is possible to reliably transmit the rotation to the magnet shaft 11 via the pin 16 by setting the looseness between the fitting portion 28a and the pin 16 to be less than the conventional looseness. That is, it is possible to improve the rotation transmissibility of the rotating shaft 28 in addition to the above-described improvement allowance of the detection accuracy of the rotation angle, and accordingly, it is possible to further improve the detection accuracy of the rotation angle of the rotating shaft 28.

Next, a method of manufacturing the gear position sensor 10 will be described.

FIGS. 8A to 8D are process diagrams indicating a method of assembling respective components of the gear position sensor of FIG. 1.

Figure 8A:
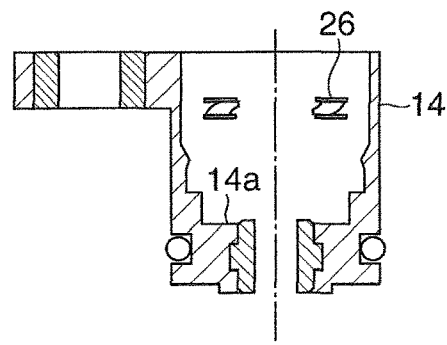
FIGS. 8A to 8D are process diagrams indicating a method of assembling respective components of the gear position sensor of FIG. 1.
Figure 8B:
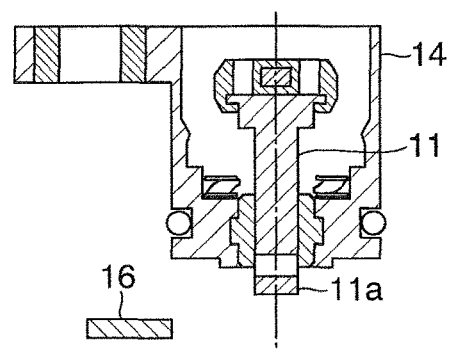

First, the spring mechanism 26 is inserted inside the case 14, and the spring mechanism 26 is placed on the case bottom 14a (FIG. 8A). Subsequently, the magnet shaft 11 is inserted inside the case 14. At this time, the one end 11a of the magnet shaft 11 passes through a bearing hole of the metal bearing 19 such that the one end 11a protrudes from the case 14 along the central axis of the case 14. Thereafter, the pin 16 is attached in the vicinity of the one end 11a (FIG. 8B).

Figure 8C:
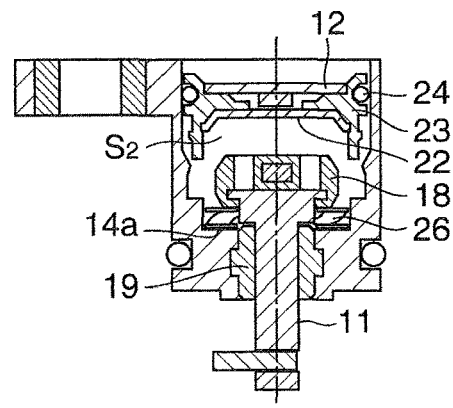
Figure 8D:
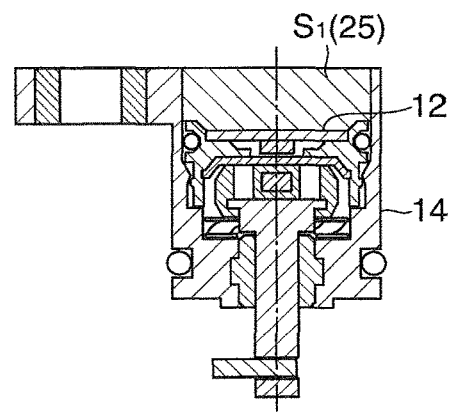

Then, the sensor unit 12 is inserted inside the case 14, and the thrust plate 22 of the sensor unit 12 is caused to abut on the molded portion 18 of the magnet shaft 11. At this time, the sensor unit 12 is pushed inside the case 14 downward in the drawing until the wave washer 26c of the spring mechanism 26 interposed between the molded portion 18 and the case bottom 14a is compressed. Here, the inner O-ring 24 attached to the holder 23 of the sensor unit 12 abuts on the inner wall of the case 14 and generates frictional force, and thus, the sensor unit 12 does not move from the pushed position (FIG. 8C).

When the sensor unit 12 is pushed downward in the drawing inside the case 14, the space $S_2$ between the sensor unit 12 and the case bottom 14a decreases, but the minute gap is present between the metal bearing 19 and the magnet shaft 11 as described above. Accordingly, the space $S_2$ is not sealed, and the air inside the space $S_2$ is not compressed even when the sensor unit 12 is pushed downward in the drawing, and is discharged outside the case 14 from the minute gap. As a result, internal pressure of the space $S_2$ does not increase, and it is possible to suppress occurrence of assembly failure of components such as disengagement of the inner O-ring 24 caused by the increase of the internal pressure of the space $S_2$.

Thereafter, the potting resin 25 is injected into the space $S_1$ formed by the sensor unit 12 and the inner wall of the case 14, and the potting resin 25 is cured so that the position of the sensor unit 12 inside the case 14 is fixed (FIG. 8D), thereby ending the present method.

It should be noted that it is necessary to secure the minute gap between the metal bearing 19 and the magnet shaft 11 in order to prevent the increase of the internal pressure of the space $S_2$ as described above. The minute gap is preferably set to a size at a degree of preventing a minute foreign substance from passing therethrough since there is a risk that the minute foreign substance enters the space $S_2$ via the minute gap and prevents smooth rotation of the magnet shaft 11 if the minute gap is too large.

Next, a method of manufacturing the magnet shaft 11 will be described.

FIGS. 9A to 9D are process diagrams indicating the method of manufacturing the magnet shaft in FIG. 1.

Figure 9A:
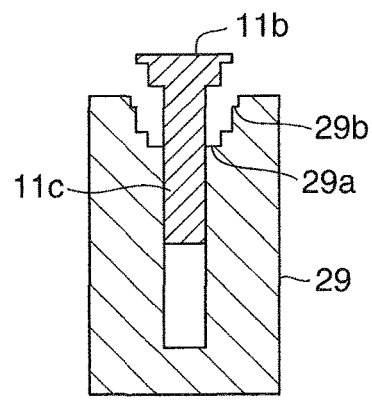
FIGS. 9A to 9D are process diagrams indicating a method of manufacturing the magnet shaft in FIG. 1.

First, a shaft body 11c of the magnet shaft 11 is inserted into a lower mold 29 (FIG. 9A). Here, the shaft body 11c is comprised of a rod-shaped body having a substantially T-shaped cross-section, and the other end 11b forms an umbrella portion. In addition, an upper portion of the lower mold 29 has a stepped shape and includes a lower stage 29a and an upper stage 29b. When the shaft body 11c is inserted into the lower mold 29, the umbrella portion (the other end 11b) of the shaft body 11c is supported by the lower stage 29a of the lower mold 29, and the position of the shaft body 11c is fixed.

Figure 9B:
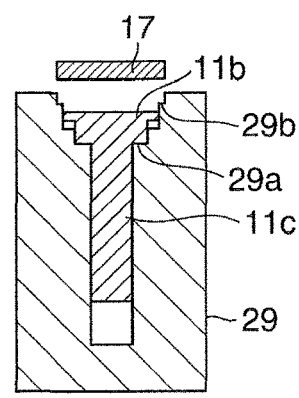
Figure 10:
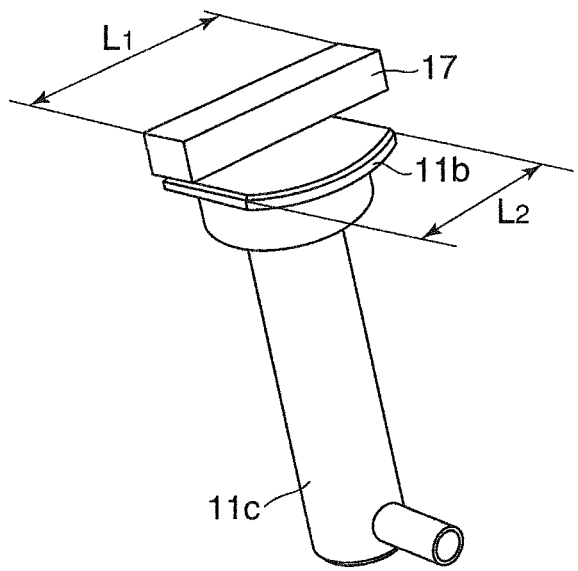
FIG. 10 is a perspective view indicating a positional relationship among a shaft body, another end (umbrella portion), and the magnet of the magnet shaft in FIG. 1.

Then, the magnet 17 is inserted into the lower mold 29. As illustrated in FIG. 10, the other end 11b of the shaft body 11c is partially cut, and a length $L_1$ which is a length of the magnet 17 in a direction orthogonal to the central axis (hereinafter, simply referred to as an "orthogonal direction") of the magnet shaft 11 is larger than a length $L_2$ which is a length of the cut portion of the other end 11b in the orthogonal direction. Accordingly, the magnet 17 is supported by the upper stage 29b without being lowered to the lower stage 29a (FIG. 9B). Here, a distance from the lower stage 29a to the upper stage 29b is set to a distance which makes the other end 11b supported by the lower stage 29a and the magnet 17 supported by the upper stage 29b maintain the predetermined interval $G_1$ therebetween. Accordingly, the magnet 17 does not contact the other end 11b.

Figure 9C:
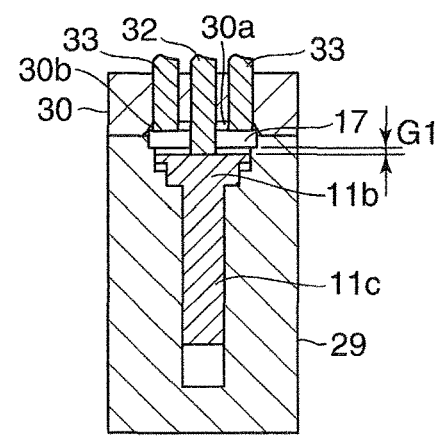
Figure 9D:
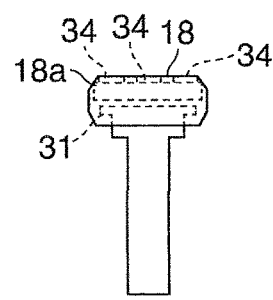
Figure 11:
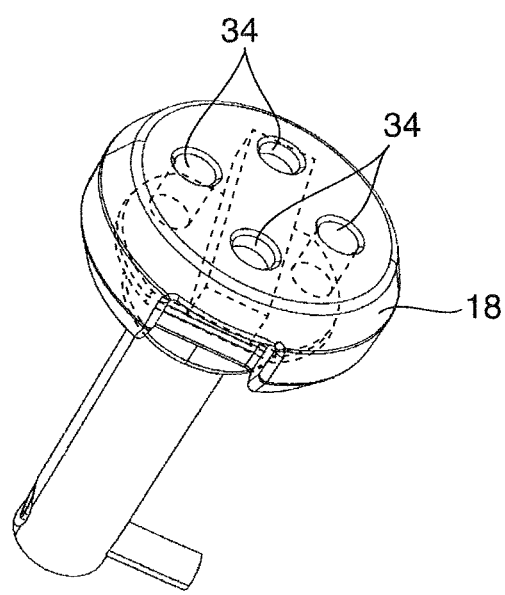
FIG. 11 is a perspective view indicating a pin hole which is formed in a molded portion.

Then, the lower mold 29 is covered by an upper mold 30. A circular dent 30a is provided on a lower surface of the upper mold 30, and a circumferential edge of the dent 30a forms a tapered portion 30b whose diameter increases downward (FIG. 9C). In addition, a dent is also provided in the upper portion of the lower mold 29 although not illustrated, and there is a gap between the upper portion of the lower mold 29 and the other end 11b of the shaft body 11c. Thereafter, the injection molding resin flows into the dent 30a of the upper mold 30 and the gap between the upper portion of the lower mold 29 and the other end 11b of the shaft body 11c, and the molded portion 18 is formed as the injection molding resin is cured. In addition, the shaft body 11c and the magnet 17 is pushed to the lower mold 29 by a shaft body fixing pin 32 and magnet fixing pins 33 penetrating through the upper mold 30 such that the other end 11b and the magnet 17 do not float from the lower mold 29 when the injection molding resin flows in the dent 30a and the gap. Accordingly, the shaft body 11c and the magnet 17 do not move at the time of molding the molded portion 18, and hence the interval $G_1$ between the other end 11b of the shaft body 11c and the magnet 17 is reliably maintained. Here, the shaft body 11c and the magnet 17 partially abuts on the lower stage 29a and the upper stage 29b of the lower mold 29 when the injection molding resin flows, and thus, concave portions 31, which partially expose the other end 11b and the magnet 17, is formed in the molded portion 18 as a result of the abutment (FIGS. 9D and 3). In addition, pin holes 34, formed by the shaft body fixing pin 32 and the magnet fixing pins 33 are opened on an upper surface of the molded portion 18 (FIG. 11), the other end 11b or the magnet 17 is exposed at each bottom of the pin holes 34. Further, a shape of the tapered portion 30b of the dent 30a is transferred to the circumferential edge of the molded portion 18, thereby forming the tapered portion 18a.

As above, the embodiment of the present invention has been described, but the present invention is not limited to the above-described embodiment. The scope of the following claims is to be accorded the broadest interpretation so as to encompass all such modifications and equivalent structures and functions.

Figure 12:
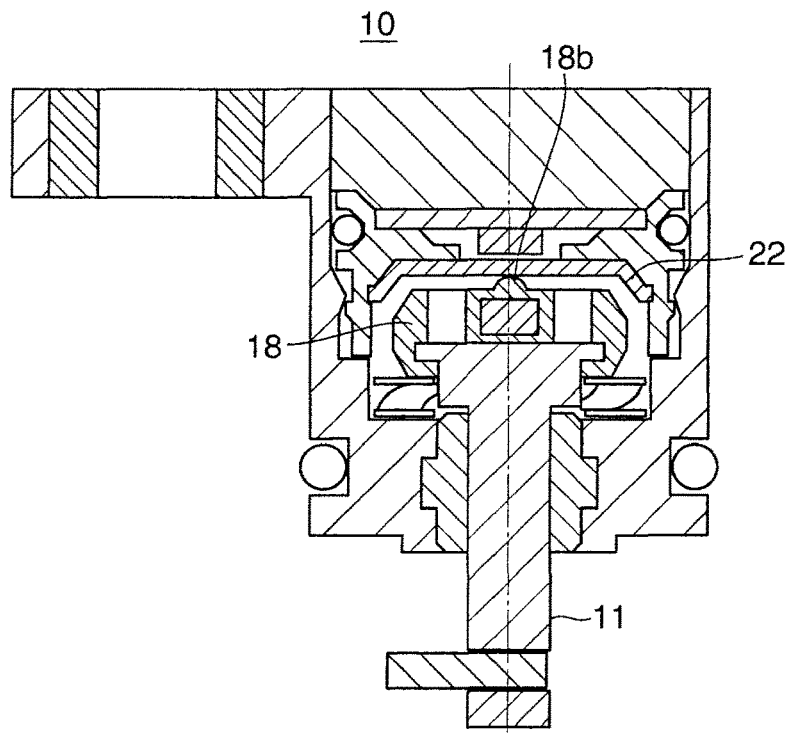
FIG. 12 is a cross-sectional view schematically showing an internal structure of a variation of the gear position sensor of FIG. 1.
Figure 13:
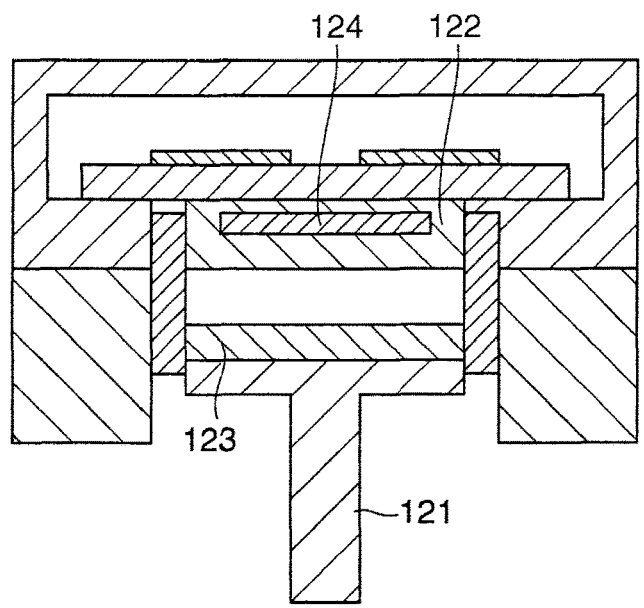
FIG. 13 is a cross-sectional view schematically showing an internal structure of a conventional gear position sensor.
Figure 14:
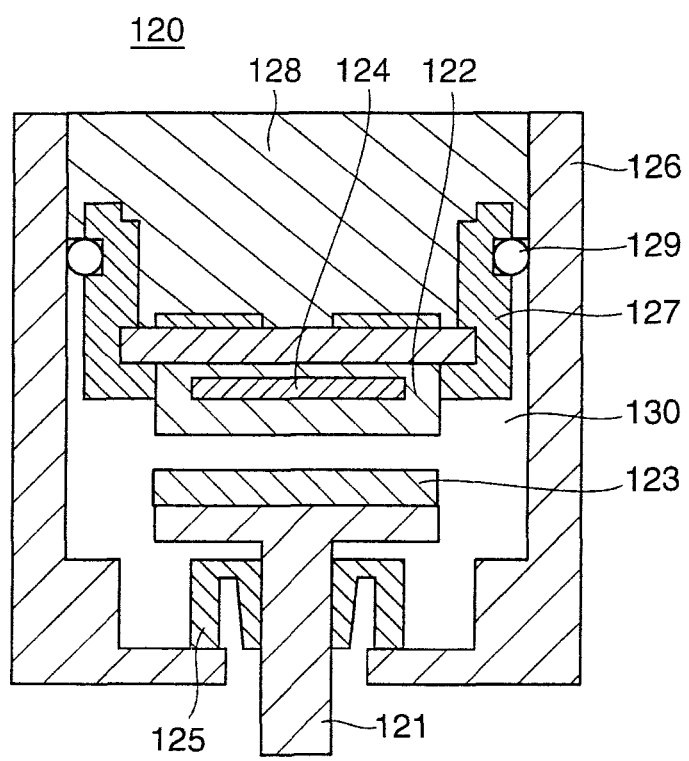
FIG. 14 is a cross-sectional view schematically showing an internal structure of a gear position sensor in which a shaft is held by an oil seal.

For example, the molded portion 18 is biased toward the thrust plate 22 and abuts on the thrust plate 22, but the molded portion 18 may include a protruding portion 18b, which protrudes toward the center of the thrust plate 22, and abut on the thrust plate 22 with the protruding portion 18b interposed therebetween as illustrated in FIG. 12. Accordingly, it is possible to significantly reduce a contact area between the molded portion 18 and the thrust plate 22 so that the frictional force acting on the molded portion 18 reduces, whereby the magnet shaft 11 can more smoothly rotate. It should be noted that a gap into which a minute foreign substance penetrates is secured between the molded portion 18 and the thrust plate 22 in this case, and thus, a size of the minute gap between the metal bearing 19 and the magnet shaft 11 needs to be set to a size which prevents a substance having a size to inhibit rotation of the magnet shaft 11 from passing therethrough.

In addition, the spring mechanism 26 includes the wave washer 26c as the biasing member, but the biasing member is not limited thereto, and a coil spring, for example, may be used.

Further, the gear position sensor 10 is assembled with the shift drum 27, but a device with which the gear position sensor 10 is assembled is not limited thereto, and the above-described gear position sensor 10 can be assembled with any device as long as the device includes a rotating body.

What is claimed is:

1. A magnetic rotation detection apparatus comprising: a circuit board that includes a Hall element; a rotation shaft which includes a magnet at an end facing the circuit board thereof; a container that houses the circuit board and the rotation shaft; and a sealing member that seals a gap between the circuit board and an inner wall of the container; the container including a bearing to rotatably support the rotation shaft; a part of the rotation shaft protruding from the bearing and being engaged with a rotating body present outside the container; rotation of the magnet, which rotates along with the rotation shaft, being detected by the Hall element; wherein
the rotation shaft includes a holding portion which fixes the magnet to the end such that the end and the magnet maintain a predetermined interval therebetween, the holding portion being made of molding resin such that a magnetic force of the magnet does not leak via the rotation shaft,
a receiving member is arranged between the holding portion of the rotation shaft and the circuit board and a biasing member which biases the holding portion of the rotation shaft to the receiving member is arranged inside the container, and
a minute gap is present between the bearing and the rotation shaft.

2. The magnetic rotation detection apparatus according to claim 1, wherein the biasing member is a wave washer.

3. The magnetic rotation detection apparatus according to claim 1, wherein the holding portion of the rotation shaft abuts on the receiving member in a vicinity of a center of the receiving member which is present on extension of the rotation shaft.

4. The magnetic rotation detection apparatus according to claim 3, wherein the holding portion of the rotation shaft includes a protruding portion which protrudes toward the receiving member and abuts on the receiving member with the protruding portion interposed therebetween.

5. The magnetic rotation detection apparatus according to claim 1, wherein the holding portion exposes at least a part of the magnet.

6. The magnetic rotation detection apparatus according to claim 1, wherein the receiving member has a first tapered portion formed on a circumferential edge thereof and the holding portion has a second tapered portion which corresponds to the first tapered portion of the receiving member.

* * * * *